Figure 1:
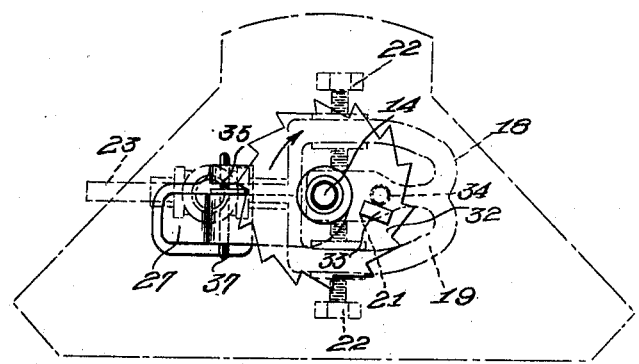

Jan. 24, 1933.   H. G. WEYMOUTH   1,895,059
METER REVERSE CONTROL MECHANISM

Filed March 15, 1928

INVENTOR.
Harry G. Weymouth
BY William A. Strauch
ATTORNEY

Patented Jan. 24, 1933

1,895,059

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

METER REVERSE CONTROL MECHANISM

Application filed March 15, 1928. Serial No. 261,798.

The present invention relates to new and useful improvements in gas meters, and more particularly to improved means for controlling and arresting movement of the tangent arm and related parts of a gas meter after having made a predetermined movement in a backward or reverse direction.

It has long been recognized that the gas in the service mains is usually at a temperature considerably lower than the temperature of the consumers service pipes, as a result of which the gas entering the service pipes naturally rises in temperature and consequently expands, thereby causing increased pressure at the outlet side of the meter which tends to force the gas back through the meter into the service main and effect a backward rotation of the indicating mechanism.

If a reverse or backward movement of the tangent arm of a meter is not provided for, when the gas is shut off at the consuming appliances equalization of pressure at the inlet and outlet sides of the meter would be slow if the valve were tight and remained seated. Such resulting difference of pressure would effect an undesirable strain on the meter mechanism possibly sufficient to break or to permanently deform the mechanism to such an extent as to impair the accuracy and effectiveness of the meter.

It has been observed in practice that in order to substantially equalize said pressure rapidly sufficiently to obviate danger of injury to the mechanism it is sufficient that the meter parts be permitted to move backward or in a reverse direction somewhat less one complete revolution.

Various attempts have heretofore been made to overcome this well recognized tendency of building up unequal pressures in a meter by providing for a reverse rotation of the tangent arm and related parts, and consequently the indicating mechanism to allow for the equalization of pressures on the inlet and outlet sides of the meter.

In the constructions heretofore proposed the tangent arm was permitted to move in a reverse direction sufficient for the substantially immediate equalization of said unbalanced pressures but was permitted to move in the reverse direction for a variable range of from one to two complete revolutions which was more than necessary to allow for equalization of the pressures and consequently reversed the movement of the indicating mechanism to a greater degree than necessary.

It is accordingly a primary object of this invention to provide mechanisms permitting the tangent arm and related parts of a gas meter to move in a reverse direction a predetermined distance sufficient to overcome said unbalanced pressures without reversing the indicating mechanism to an extent more than necessary.

It is another object of my invention to provide means for positively arresting backward movement of the tangent arm and related parts after substantially one complete reverse revolution has been completed thereby.

It is a further object of this invention to provide stop mechanism for positively arresting movement of the tangent arm and connected parts after having made substantially one complete reverse revolution irrespective of the initial position and relation of parts.

It is a still further object of my invention to provide means of the character above referred to that is simple in construction, reliable in operation, and comparatively inexpensive to manufacture.

With these objects in view as well as others that will become apparent from the following disclosure, reference will be had to the accompanying drawing forming a part thereof, and in which,—

Figure 2:
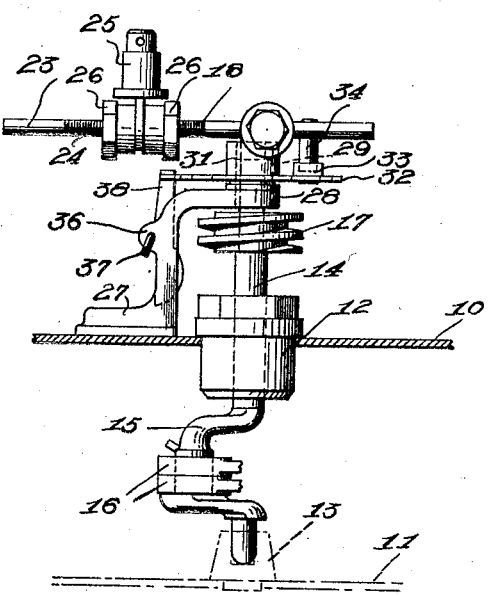

Figure 1, is a top plan view of an improved form of mechanism and co-operating parts embodying my invention, the meter casing and tangent arm being shown in dot and dash lines for the sake of clearness and, Figure 2 is a side elevational view of the construction shown in Figure 1.

Referring to the drawing in which is illustrated valve and registering mechanism actuating means of the character employed in the well known type of diaphragm meters, 10 designates the crank plate which forms the top of the valve chamber cover and 11 designates the plate dividing the diaphragm and valve chambers of a meter. Fixed in plate 10 is a stuffing box and bearing member 12 preferably of white metal and fixed in plate 11 in vertical alinement with stuffing box 12 is a step bearing 13. Rotatably journaled in stuffing box 12 intermediate its ends and similarly journaled at its inner end in step bearing 13 is a rotatable crank shaft 14 provided with crank 15 between plates 10 and 11 to which the valve actuating rods 16 are rotatably secured, shaft 14 above plate 10 being provided with the usual registering mechanism operating worm 17. Rigidly secured to the outer end of crank shaft 14 is tangent arm 18 which as shown more particularly in dot and dash lines in Figure 1 is of the duplex adjustable form comprising a looped body portion 19 provided with a yieldable inwardly extending tongue 21 such as resilient sheet metal, and preferably sheet brass which adjacent its free end is secured to shaft 14. A pair of adjusting screws 22 are adjustably threaded into the opposite sides of portion 19 in laterally alined position for engagement with tongue 21 to adjust the position of tongue 21 relative to the sides of body portion 19. Tangent arm 18 further comprises an elongated shank 23 threaded as at 24 for adjustable engagement therewith of post 25 which is held in adjusted position on shank 23 by jamb nuts 26. By these constructions it will be seen that provision is made for both angular and throw adjustment of the flag arms the outer ends of which are journaled on post 25.

Carried by plate 10 adjacent shaft 14 is a bracket 27 preferably of white metal or bronze which as shown is provided with a laterally extending section 28. Section 28, adjacent the end thereof is apertured for the reception of a stationary bushing 29 which provides a convenient bearing for shaft 14 intermediate worm 17 and tangent arm 18. Journaled on bushing 29 through the hub portion 31 is a ratchet wheel 32 preferably of tinned brass or bronze provided with a lug 33 adapted for engagement by a downwardly projecting pin 34 carried by tangent arm 18.

Bracket 27 is bifurcated as at 35 providing a pair of spaced alined apertured ears 36 and pivoted between ears 36 by means of a pintle 37 such as a bent wire extending through the apertures in ears 36 is the intermediate portion of a gravity pawl 38 whose upper end swings inward by gravity into the depressions formed by the teeth of ratchet wheel 32. Pawl 38 is also preferably constructed of tinned bronze or brass.

In the operation of the construction above described tangent arm 18 in the normal operation of the meter, moves in a direction such that pin 34 engages lug 33 to move ratchet wheel 32 in the direction indicated by the arrow in Figure 1 in which movement the long inclined edges of the teeth of ratchet wheel 32 successively ride in engagement with the upper end of pawl 38 imparting a continuous rocking motion thereto and allowing ratchet wheel 32 and tangent arm 18 to rotate freely. If for any cause such for example, as has been above referred to, the gas pressure on the outlet of the meter exceeds the gas pressure at the inlet thereof, tangent arm 18 will be driven in the reverse direction by gas passing backward through the meter causing pin 34 to move away from contact with lug 33 and to engage the opposite face of lug 33 after tangent arm 18 has moved somewhat less than a complete revolution in the reverse direction. Pin 34 upon engaging the opposite face of lug 33 will tend to rotate ratchet wheel 32 in the reverse direction which will be prevented by engagement of pawl 38 with the radial edge of an adjacent tooth of ratchet wheel 32 and accordingly further reverse movement of tangent arm 18 will be impossible.

It will accordingly be seen that with the relative proportion of parts shown tangent arm 18 will be permitted to move in a reverse direction less than a complete revolution by an amount equal to the sum of the width of lug 33 and the diameter of pin 34 minus the distance that might exist between pawl 38 and radial edge of adjacent tooth of ratchet wheel 32 when tangent arm 18 begins its reverse movement. It will be apparent to those skilled in the art that ratchet wheels having varying numbers and sizes of teeth and lugs 33 and pins 34 of different sizes may be provided and by proportioning the parts properly the reverse movement of arm 18 may be equal to or greater than a single revolution.

From the foregoing disclosure it will be seen that an improved reverse movement control means for gas meters is provided which is simple in construction and which upon the existence of unbalanced gas pressures above referred to will permit the mechanism to move in a reverse direction a predetermined and substantially uniform amount just sufficient to provide for satisfactory equalization of pressures obviating danger to the mechanisms. The construction is furthermore such that the reverse movement will be substantially uniform in successive reverse operations regardless of the relative position of parts at the beginning of the reverse movement.

Having disclosed but a single embodiment of my invention it is to be understood that my invention is not limited thereto but includes such changes or alterations as fairly fall within the scope of the subjoined claims.

Accordingly, what I claim and desire to secure by United States Letters Patent is:—

1. In a gas meter the combination of a driven shaft; a tangent arm carried by said shaft; and stop means for arresting movement of said tangent arm and said shaft after a substantially fixed range of reverse movement thereof.

2. In combination with the crank shaft and tangent arm of a gas meter, a stop detent mechanism supported by said meter for co-operation with said tangent arm to arrest movement thereof after slightly less than one complete reverse revolution independently of the point from which said reverse rotation is initiated.

3. In combination with the crank shaft and tangent arm of a gas meter, stop means co-operating with said tangent arm for permitting a uniform range of reverse movement of said tangent arm and shaft irrespective of the relative position of said tangent arm at the beginning of said reverse movement.

4. In a gas meter the combination of a driven shaft, a tangent arm carried by said shaft; a projection carried by said tangent arm; a member carrying a second projection constantly in contact with said first projection and movable therewith upon movement of said tangent arm in one direction; means for preventing movement of said second projection in the opposite direction for arresting movement of said tangent arm by engagement of said first projection with said second projection upon substantially one complete reverse revolution of said tangent arm.

5. In combination with the crank shaft and tangent arm of a gas meter; a bracket supported adjacent said crank shaft and providing a bearing therefor; a ratchet wheel rotatably supported by said shaft adjacent said bracket; co-operating engaging members carried by said tangent arm and said ratchet wheel; and a pawl pivoted in said bracket for co-operation with said ratchet wheel for limiting rotation thereof to one direction only.

6. In combination with the crank shaft and tangent arm of a gas meter; a bracket supported adjacent said shaft; a bushing supported by said bracket and providing a bearing for said shaft; a ratchet wheel journaled on said bushing; a lug carried by said ratchet wheel; a pin carried by said tangent arm for engagement with said lug for imparting movement of said tangent arm to said ratchet wheel; and a gravity actuated pawl pivoted in said bracket for co-operation with said ratchet wheel for preventing reverse rotation thereof.

In testimony whereof I affix my signature.

HARRY G. WEYMOUTH.